US010643303B1

(12) United States Patent
Cotoros

(10) Patent No.: US 10,643,303 B1
(45) Date of Patent: May 5, 2020

(54) SYSTEMS AND METHODS FOR PROVIDING PUNCHOUTS OF VIDEOS

(71) Applicant: GoPro, Inc., San Mateo, CA (US)

(72) Inventor: Ingrid A. Cotoros, Hillsborough, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/288,692

(22) Filed: Feb. 28, 2019

(51) Int. Cl.
*H04N 13/25* (2018.01)
*H04N 5/232* (2006.01)
*G06T 3/00* (2006.01)
*H04N 13/229* (2018.01)

(52) U.S. Cl.
CPC ........ *G06T 3/0087* (2013.01); *H04N 5/23218* (2018.08); *H04N 13/229* (2018.05); *H04N 13/25* (2018.05)

(58) Field of Classification Search
CPC .... G06T 3/0087; H04N 13/25; H04N 13/229; H04N 5/23218

USPC .......................................................... 348/36
See application file for complete search history.

(56) References Cited

U.S. PATENT DOCUMENTS

| | | | |
|---|---|---|---|
| 9,721,165 B1* | 8/2017 | Bentley | G06K 9/00751 |
| 2009/0324191 A1* | 12/2009 | Reusens | G06T 15/50 |
| | | | 386/353 |
| 2012/0249812 A1* | 10/2012 | Li | G06K 9/00758 |
| | | | 348/208.1 |
| 2017/0024614 A1* | 1/2017 | Sanil | G11B 27/031 |

* cited by examiner

*Primary Examiner* — Jared Walker
(74) *Attorney, Agent, or Firm* — Esplin & Associates, PC

(57) ABSTRACT

A video edit of first video content and second video content may be generated based on the fields of view of the first video content and the second video content. Based on the fields of view of the first video content and the second video content, a first viewing window for the first video content and a second viewing window for the second video content may be determined. The viewing windows may define one or more extents of the corresponding visual content. The video edit may include a punchout of the first video content based on the first viewing window and a punchout of the second video content based on the second viewing window.

20 Claims, 12 Drawing Sheets

SYSTEMS AND METHODS FOR PROVIDING PUNCHOUTS OF VIDEOS

FIELD

This disclosure relates to providing different punchouts of videos based on fields of view of the videos.

BACKGROUND

Creating a video edit from video(s) with a wide field of view is challenging because users must determine both moments in the video(s) to be included in the video edit, and the fields of view at the corresponding moments. That is, users must determine where relevant materials are located in the video(s) in terms of time and space. Creating such video edits may be complicated and time consuming.

SUMMARY

This disclosure relates to providing punchouts of videos. First video information defining a first video, second video information defining a second video, and/or other information may be obtained. The first video may include first video content having a first progress length. The first video content may include a first set of video frames that defines first visual content as a function of progress through the first progress length. The first visual content may have a first field of view. The second video may include second video content having a second progress length. The second video content may include a second set of video frames that defines second visual content as a function of progress through the second progress length. The second visual content may have a second field of view. The first field of view of the first visual content and the second field of view of the second visual content may be determined. A first viewing window for the first visual content and a second viewing window for the second visual content may be determined based on the first field of view and the second field of view. The first viewing window may define one or more extents of the first visual content, and the second viewing window may define one or more extents of the second visual content. A video edit of the first video and the second video may be generated based on the first viewing window and the second viewing window. The video edit may include a first punchout of the first visual content based on the first viewing window and a second punchout of the second visual content based on the second viewing window.

A system that provides punchouts of videos may include one or more electronic storage, processor and/or other components. The electronic storage may store video information defining videos, information relating to videos, information relating to fields of view, information relating to viewing windows, information relating to punchouts of visual content, information relating to video edits, and/or other information.

The processor(s) may be configured by machine-readable instructions. Executing the machine-readable instructions may cause the processor(s) to facilitate providing punchouts of videos. The machine-readable instructions may include one or more computer program components. The computer program components may include one or more of a video information component, a field of view component, a viewing window component, a video edit component, and/or other computer program components.

The video information component may be configured to obtain video information and/or other information. Video information may define a video. The video information component may obtain video information from one or more storage locations. The video information component may obtain video information during acquisition of the video and/or after acquisition of the video by one or more image sensors/image capture devices.

For example, the video information component may obtain first video information defining a first video and second video information defining a second video. The first video may include first video content having a first progress length and the second video may include second video content having a second progress length. The first video content may include a first set of video frames that defines first visual content as a function of progress through the first progress length, and the second video content may include a second set of video frames that defines second visual content as a function of progress through the second progress length. The first visual content may have a first field of view, and the second visual content may have a second field of view. The first field of view may include a spherical field of view or a non-spherical field of view. The second field of view may include a spherical field of view or a non-spherical field of view.

In some implementations, the first video may be captured by a first image capture device, and the second video may be captured by a second image capture device. The first image capture device may generate metadata during capture of the first video. The metadata may be used to temporally and spatially identify first depiction of interest within the first visual content and second depiction of interest within the second visual content. The first depiction of interest and the second depiction of interest may include visual depictions of a same subject or visual depictions of different subjects.

The field of view component may be configured to determine the first field of view of the first visual content and the second field of view of the second visual content. The field of view component may determine a field of view of visual content based on analysis of the visual content, analysis of metadata relating to the visual content, and/or other information.

The viewing window component may be configured to determine a first viewing window for the first visual content and a second viewing window for the second visual content based on the first field of view and the second field of view. The first viewing window may define one or more extents of the first visual content. The second viewing window may define one or more extents of the second visual content.

In some implementations, the extent(s) of the first visual content defined by the first viewing window may include (1) a first set of extents based on the first field of view and the second field of view including the spherical field of view; or (2) a second set of extents based on the first field of view including the spherical field of view and the second field of view including a non-spherical field of view. The first set of extents may be different from the second set of extents.

In some implementations, determining the first viewing window for the first visual content based on the first field of view and the second field of view may include determining a size of the first viewing window based on the first field of view and the second field of view. In some implementations, one or more distortions to be applied to visual content within the first viewing window and/or the second viewing window may be determined.

In some implementations, determining the first viewing window for the first visual content based on the first field of view and the second field of view may include determining a movement of the first viewing window based on the first field of view and the second field of view.

In some implementations, the first viewing window for the first visual content may be determined further based on tracking of a subject within the first visual content.

The video edit component may be configured to generate a video edit of the first video and the second video. The video edit of the first video and the second video may be generated based on the first viewing window, the second viewing window, and/or other information. The video edit may include a first punchout of the first visual content based on the first viewing window and a second punchout of the second visual content based on the second viewing window.

In some implementations, the first punchout may include the extent(s) of the first visual content defined by the first viewing window and the second punchout may include the extent(s) of the second visual defined by the second viewing window.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
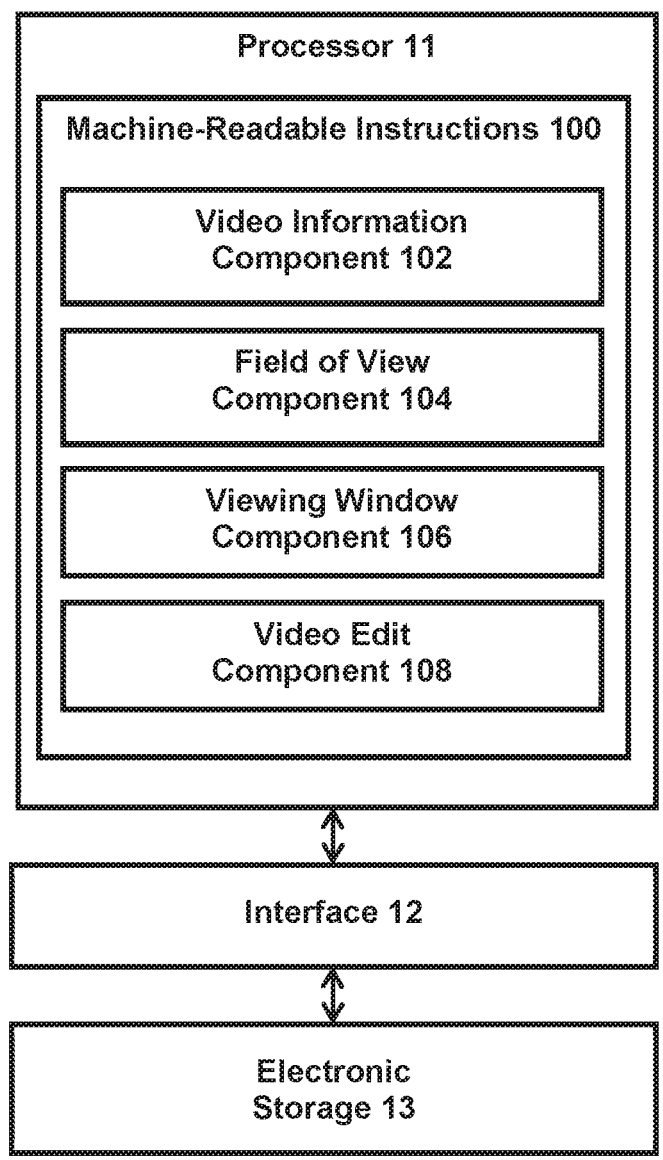
FIG. 1 illustrates a system that provides punchouts of videos.

FIG. 1 illustrates a system 10 for providing punchouts of videos. The system 10 may include one or more of a processor 11, an interface 12 (e.g., bus, wireless interface), an electronic storage 13, and/or other components. First video information defining a first video, second video information defining a second video, and/or other information may be obtained by the processor 11. The first video may include first video content having a first progress length. The first video content may include a first set of video frames that defines first visual content as a function of progress through the first progress length. The first visual content may have a first field of view. The second video may include second video content having a second progress length. The second video content may include a second set of video frames that defines second visual content as a function of progress through the second progress length. The second visual content may have a second field of view.

The first field of view of the first visual content and the second field of view of the second visual content may be determined by the processor 11. A first viewing window for the first visual content and a second viewing window for the second visual content may be determined by the processor 11 based on the first field of view and the second field of view. The first viewing window may define one or more extents of the first visual content, and the second viewing window may define one or more extents of the second visual content. A video edit of the first video and the second video may be generated by the processor 11 based on the first viewing window and the second viewing window. The video edit may include a first punchout of the first visual content based on the first viewing window and a second punchout of the second visual content based on the second viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining videos, information relating to videos, information relating to fields of view, information relating to viewing windows, information relating to punchouts of visual content, information relating to video edits, and/or other information.

A video may include content captured by a single image capture device (e.g., image sensor, camera), multiple image capture devices, and/or one or more other capture devices (e.g., sound sensor, microphone). A video including content captured by multiple capture devices may include content captured at the same location(s), content captured at different locations, content captured at the same time(s), and/or content captured at different times. A video may include edited content. For example, a video may include content of one or more other videos that have been edited into a video edit.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content. Video content may include and/or be associated with metadata associated with the video content, such as information characterizing capture of the video content. For example, metadata of video content may include location information (e.g., generated by GPS, other location sensor) and/or motion information (e.g., generated by IMU, other motion sensor) characterizing location and/or motion of an image capture device during capture of the video content.

Visual content may refer to content of one or more images and/or one or more videos that may be consumed visually. For example, visual content may be included within one or more image and/or one or more video frames of a video. The video frame(s) may define the visual content of the video content. That is, video content may include video frame(s) that define the visual content of the video content. Video frame(s) may define visual content viewable as a function of progress through the progress length of the video content. A video frame may include an image of the video content at a moment within the progress length of the video content. Visual content may be generated based on light received within a field of view of a single image sensor or within fields of view of multiple image sensors during a capture period.

Visual content may have a field of view. A field of view of visual content may refer to an extent of a scene captured and/or viewable within the visual content. A field of view of visual content may refer to a part of a scene from which light is received for generation of the visual content. For example, the video may include a spherical video defining visual content viewable from a point of view as a function of progress through the progress length, and the field of view may of the spherical video may include a spherical field of view (360 degrees of capture). A field of view of visual content may be static (unchanging) or dynamic (changing). For example, a field of view of visual content of video content may change as a function of progress through the progress length of the video content. Other fields of view are contemplated.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with at least a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. Other sizes and qualities of spherical video content (e.g., 5.6K, 8K+) are contemplated. In some implementations, spherical video content may be consumed as virtual reality content.

Virtual reality content may refer to video content that may be consumed via virtual reality experience. Virtual reality content may associate different directions within the virtual reality content with different viewing directions, and a user may view a particular visual portion (e.g., visual content in a particular direction) within the virtual reality content by looking in a particular direction. For example, a user may use a virtual reality headset to change the user's direction of view. The user's direction of view may correspond to a particular direction of view within the virtual reality content. For example, a forward/north looking direction of view for a user may correspond to a forward/north direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video content captured from a path taken by the image capture device(s) in the moving position. For example, spherical video content and/or virtual reality content may include video content captured by a spherical camera of a person walking around in a music festival.

Figure 3:
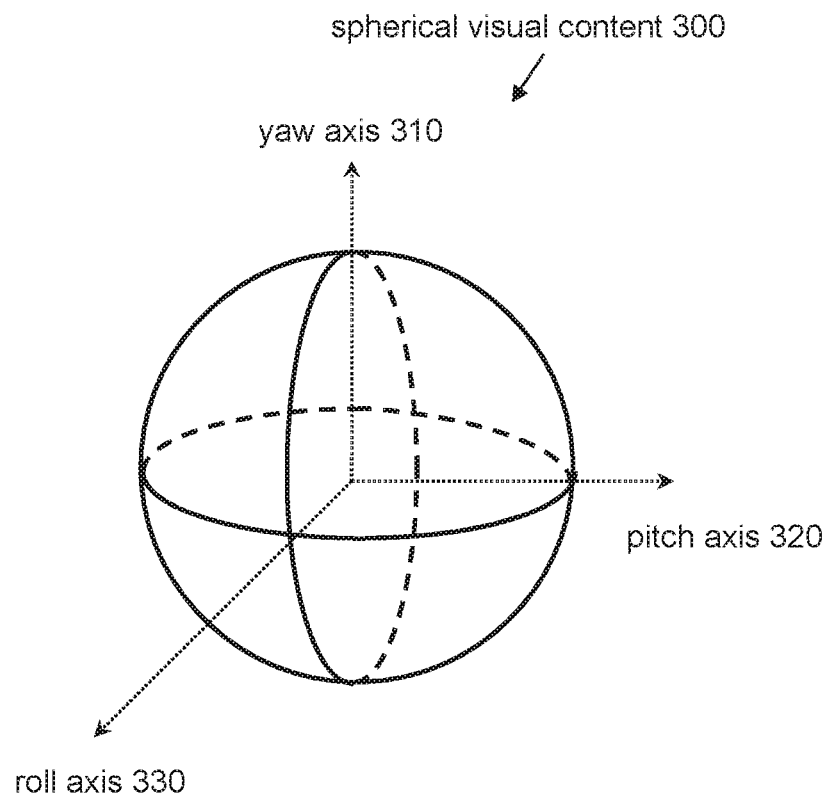
FIG. 3 illustrates an example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

For example, a 0-degree rotation of the spherical visual content 300 around the yaw axis 310 may correspond to a front viewing direction. A 90-degree rotation of the spherical visual content 300 around the yaw axis 310 may correspond to a right viewing direction. A 180-degree rotation of the spherical visual content 300 around the yaw axis 310 may correspond to a back-viewing direction. A −90-degree rotation of the spherical visual content 300 around the yaw axis 310 may correspond to a left viewing direction.

A 0-degree rotation of the spherical visual content 300 around the pitch axis 320 may correspond to a viewing direction that may be level with respect to horizon. A 45-degree rotation of the spherical visual content 300 around the pitch axis 320 may correspond to a viewing direction that may be pitched up with respect to horizon by 45-degrees. A 90-degree rotation of the spherical visual content 300 around the pitch axis 320 may correspond to a viewing direction that may be pitched up with respect to horizon by 90-degrees (looking up). A −45-degree rotation of the spherical visual content 300 around the pitch axis 320 may correspond to a viewing direction that may be pitched down with respect to horizon by 45-degrees. A −90-degree rotation of the spherical visual content 300 around the pitch axis 320 may correspond to a viewing direction that may be pitched down with respect to horizon by 90-degrees (looking down).

A 0-degree rotation of the spherical visual content 300 around the roll axis 330 may correspond to a viewing direction that may be upright. A 90-degree rotation of the spherical visual content 300 around the roll axis 330 may correspond to a viewing direction that may be rotated to the right by 90-degrees. A −90-degree rotation of the spherical visual content 300 around the roll axis 330 may correspond to a viewing direction that may be rotated to the left by 90-degrees. Other rotations and viewing directions are contemplated.

A playback of video content (e.g., the spherical video content) may include presentation of one or more portions of visual content on one or more displays based on a viewing window and/or other information. A viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
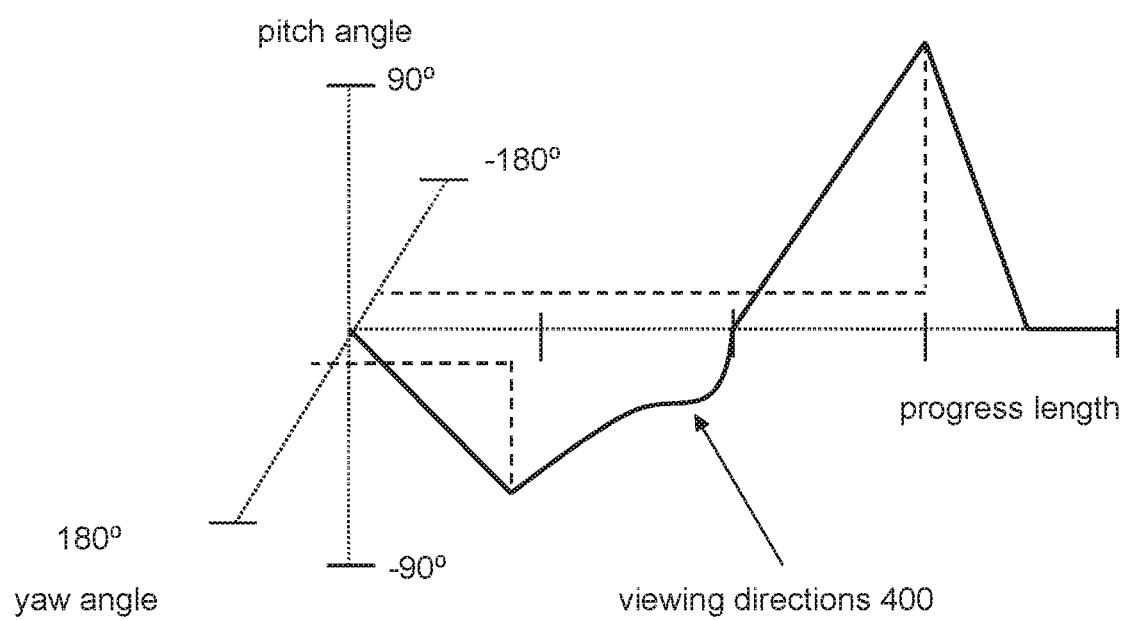
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. The viewing directions 400 may define a path of movement for the viewing window (e.g., a trajectory followed by the viewing window) as a function of progress through the progress length of the video content. Other viewing directions are contemplated.

A viewing size may define a size of the viewing window. A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

Figures 5A, 5B:
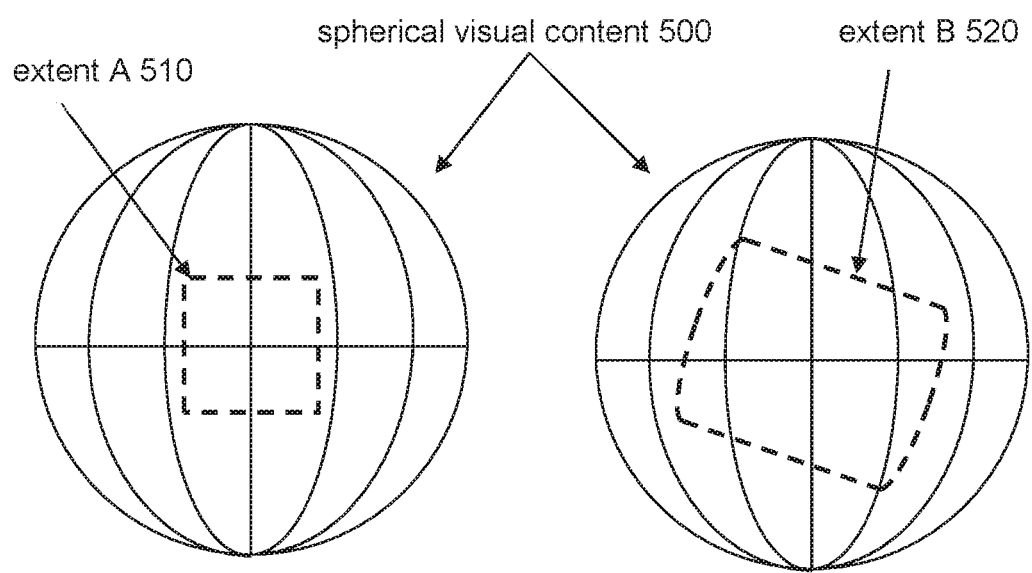
FIGS. 5A-5B illustrate example extents of spherical visual content.

FIGS. 5A-5B illustrate examples of extents for spherical visual content 500. In FIG. 5A, the size of the viewable extent of the spherical visual content 500 may correspond to the size of extent A 510. In FIG. 5B, the size of viewable extent of the spherical visual content 500 may correspond to the size of extent B 520. Viewable extent of the spherical visual content 500 in FIG. 5A may be smaller than viewable extent of the spherical visual content 500 in FIG. 5B. The viewable extent of the spherical visual content 500 in FIG. 5B may be more tilted with respect to the spherical visual content 500 than viewable extent of the spherical visual content 500 in FIG. 5A. Other viewing sizes and viewing rotations are contemplated.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate providing punchouts of videos. The machine-readable instructions 100 may include one or more computer program components. The machine-readable instructions 100 may include one or more of a video information component 102, a field of view component 104, a viewing window component 106, a video edit component 108, and/or other computer program components.

The video information component 102 may be configured to obtain video information defining one or more videos s (e.g., non-spherical video, spherical video, panoramic video) and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining a video during acquisition of the video and/or after acquisition of the video by one or more image sensors/image capture devices. For example, the video information component 102 may obtain video information defining a video while the video is being captured by one or more image sensors/image capture devices. The video information component 102 may obtain video information defining a video after the video has been captured and stored in memory (e.g., the electronic storage 13).

In some implementations, the video information may be obtained based on user interaction with a user interface/application (e.g., video editing application), and/or other information. For example, a user interface/application may provide option(s) for a user to select one or more videos from which one or more video edits are to be generated. The video information defining the video(s) may be obtained based on the user's selection of the video(s) through the user interface/video application.

Video information may be stored within a single file or multiple files. For example, video information defining a video may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The video information component 102 may obtain video information defining different videos. For ease of reference, different videos may be referred to as video A and video B. For example, the video information component 102 may obtain video A information (e.g., video A file) defining a video A and video B information (e.g., video B file) defining a video B. The video A and the video B may individually include video content having a progress length. The video content of the video A and the video B may individually include a set of video frames that defines visual content of the corresponding video as a function of progress through the progress length of the corresponding video. The progress length of the video content of the video A may be the same as or different from the progress length of the video content of the video B.

The visual content of the video A may have a field of view, and the visual content of the video B may have a field of view. The fields of view of the visual content may include a spherical field of view and/or a non-spherical field of view. The fields of view of the different visual content may be the same as or different from each other.

Figure 6A:
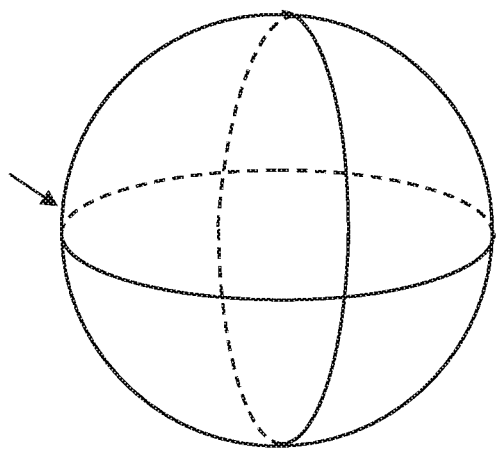
FIGS. 6A-6C illustrates examples of visual content with different fields of view.
Figure 6A:
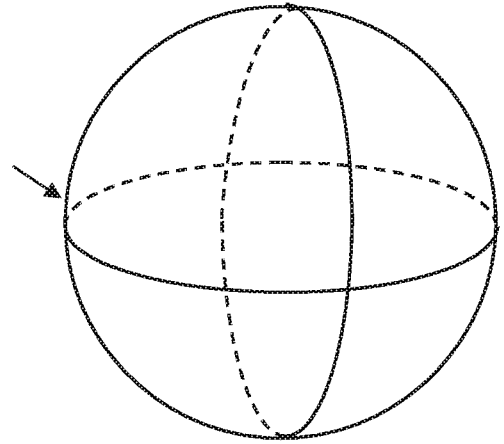
Figure 6B:
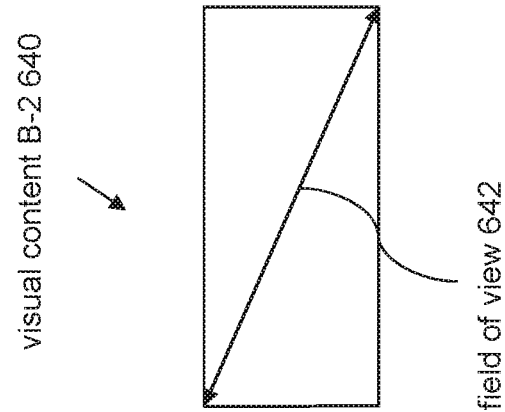
Figure 6B:
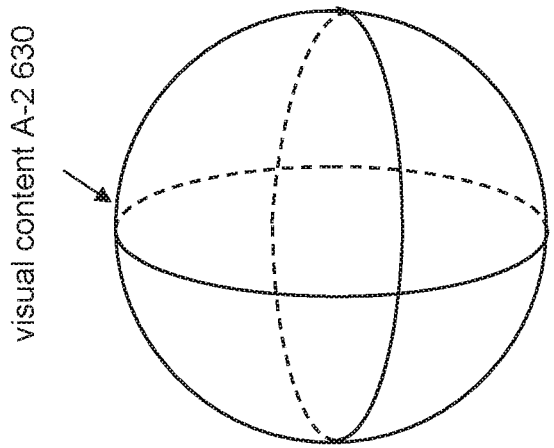
Figure 6C:
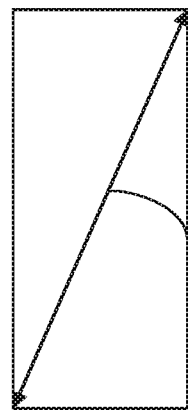
Figure 6C:
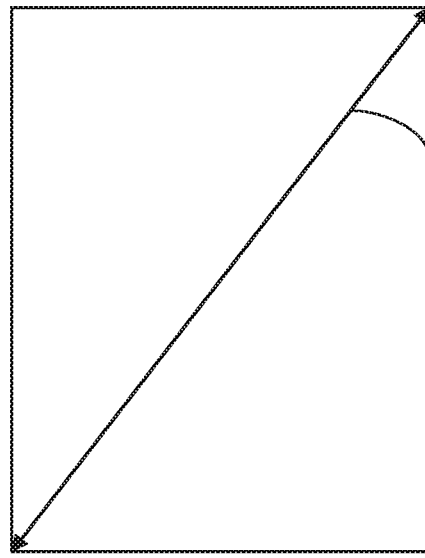

FIGS. 6A-6C illustrates example fields of view of the visual content of different videos (e.g., the video A, the video B). In FIG. 6A, the field of view of the visual content A-1 610 (the field of view of the visual content of the video A) may include a spherical field of view (e.g., full sphere, field of view of a spherical image capture device) and the field of view of the visual content B-1 620 (the field of view of the visual content of the video B) may include a spherical field of view (e.g., full sphere, field of view of a spherical image capture device). In FIG. 6B, the field of view of the visual content A-2 630 may include a spherical field of view (e.g., full sphere, field of view of a spherical image capture device) and the field of view of the visual content B-2 640 may include a field of view 642 (e.g., non-sphere, panorama, field of view of a two-dimensional image capture device). In FIG. 6C, the field of view of the visual content A-3 650 may include a field of view 652 (e.g., non-sphere, panorama, field of view of a two-dimensional image capture device) and the field of view of the visual content B-3 660 may include a field of view 662 (e.g., non-sphere, panorama, field of view of a two-dimensional image capture device). The field of view 652 may be larger than the field of view 662.

The field of view component 104 may be configured to determine one or more fields of view of one or more visual content. For example, the field of view component 104 may be configured to determine the fields of view of the visual content of the video A and the video B. Determining a field of view of visual content may include identifying the field of view with which the visual content was captured by one or more image capture device, calculating the field of view contained within the visual content, and/or otherwise determining the field of view of the visual content. The field of view component 104 may determine a field of view of visual content based on analysis of the visual content, analysis of metadata relating to the visual content, and/or other information.

Analysis of the visual content may include examination of one or more pixels, one or more groupings of pixels, one or more pixel characteristics (e.g., color, contrast, brightness), and/or other visual features of the visual content to calculate the extent of one or more scenes captured and/or viewable within the visual content. For example, the visual content may be analyzed to detect the extent of a scenery, number and/or extents of things, certain classes of objects in the scene, and/or other visual depictions captured within the visual content to estimate the field of view of the visual content.

Analysis of metadata relating to the visual content may include examination of one or more metadata of the visual content to identify the field of view of the visual content. Metadata of the visual content may refer to data that describes the visual content, provides information about the visual content, and/or is otherwise related to the visual content. Metadata of the visual content may be generated and/or stored with the capture of the visual content. For example, metadata of the visual content may include information about the field of view used by an image capture device to capture the visual content, information about the image capture device used to capture the visual content, and/or other information about the visual content, including object and scene information identification. The field of view may be identified directly from the metadata (e.g., the field of view information extracted from the metadata) and/or indirectly from the metadata (e.g., the field of information identified based on image capture device information extracted from the metadata). Other determinations of the field of view of visual content are contemplated.

Determination of fields of view of visual content may include determination on spherical/non-spherical nature of the fields of view, determination on relative size of the fields of view, and/or determination of values that characterize the fields of view. For example, field of view component 104 may determine whether the field of view of the visual content includes a spherical field of view or a non-spherical field of view. For instance, referring to FIG. 6B, the field of view component 104 may determine that the field of view of the visual content A-2 630 includes a spherical field of view and that the field of view 642 of the visual content B-2 640 includes a non-spherical field of view. Referring to FIGS. 6A and 6B, the field of view component 104 may determine that the fields of view of the visual content A-1 610 and the visual content B-1 620 are the same and that the fields of view of the visual content A-2 630 and the visual content B-2 640 are different. Referring to FIG. 6C, the field of view component 104 may determine that the field of view 650 of the visual content A-3 650 is larger than the field of view 660 of the visual content B-3 660. Referring to FIG. 6B, the field of view component 104 may determine that the field of view of the visual content A-2 630 includes 360-degrees of capture and that the field of view of the visual content B-2 640 include less than 360-degrees of capture (e.g., 90-degree capture vs 120-degree capture).

The viewing window component 106 may be configured to determine one or more viewing windows for one or more visual content. A viewing window may define extents of the visual content to be included within a punchout of the visual content. A punchout of the visual content may refer to an output of one or more portions of the visual content for presentation. A punchout of the visual content may refer to extents of the visual content that is obtained for viewing and/or extraction. The extents of the visual content viewable/extracted within the viewing window may be used to provide views of different spatial portions of the visual content. For example, the visual content may include a field of view, and the punchout of the visual content may include the entire extent of the visual content (the visual content within the entire field of view) or one or more extents of the visual content (the visual content within one or more portions of the field of view). A viewing window may define extents of the visual content to be included within a punchout of the visual content as the function of progress through the progress length of the video content. A viewing window may correspond to the entire duration of the progress length or for one or more portions (e.g., portions including moments of interest) of the progress length. The punchout of the visual content may be presented on one or more display, included in one or more video edits, and/or otherwise used for presenting the visual content.

A viewing window for visual content may be determined based on the field of view of the visual content, the field(s) of view of one or more other visual content, and/or other information. For example, the viewing window component 106 may determine a viewing window for the visual content of the video A based on the field of view of the video A, the field of view of the video B, and/or other information. The viewing window component 106 may determine a viewing window for the visual content of the video B based on the field of view of the video A, the field of view of the video B, and/or other information. Based on a comparison of the fields of view of the multiple visual content of the videos A and B, the viewing window for the visual content of the video A and the viewing window for the visual content of the video B may be determined. The viewing window may define one or more extents of the corresponding visual content. For spherical visual content, the viewing window may define extents of the visual content viewable from a point of view. The extent(s) of the visual content may be defined by the viewing window based on one or more of viewing directions, viewing sizes (e.g., viewing zoom, viewing magnification), and/or viewing rotations of the viewing window. The viewing window determined for the visual content of the video A may be the same as or different from the viewing window determined for the visual content of the video B.

For example, the viewing window determined for the video A may include one or more extents (a set of extents) of the visual content of the video A based on the fields of the visual content of the videos A and B both including a spherical field of view. The viewing window determined for the video A may include another (different) set of extents of the visual content of the video A based on the field of the visual content of the video A including a spherical field of view and the field of the visual content of the video B including a non-spherical field of view. The viewing window determined for the video A may include yet another (different) set of extents of the visual content of the video A based on the field of the visual content of the video A including a non-spherical field of view and the field of the visual content of the video B including a spherical field of view.

Determination of a viewing window of visual content based on the field of view of the visual content and the field(s) of view of other visual content may include determination of the viewing window based on the spherical/non-spherical nature of the fields of view, based on the relative size of the fields of view, and/or based on the values that characterize the fields of view.

For example, the field of view component 104 may determine a viewing window for visual content based on whether the field of view of the visual content includes a spherical field of view or a non-spherical field of view and whether the field(s) of view of other visual content includes a spherical field of view and/or a non-spherical field of view. The field of view component 104 may determine a viewing window for visual content based on whether the field of view of the visual content is the same as, larger than, and/or smaller than the field(s) of view of other visual content. The field of view component 104 may determine a viewing window for visual content based on the amount of degrees of capture within the field of view of the visual content and the amount(s) of degrees of capture within the field(s) of view of other visual content.

Determination of a viewing window of visual content based on the field of view of the visual content and the field(s) of view of other visual content may include determination of one or more of one or more of viewing directions, viewing sizes, viewing rotations, and/or other characteristics of the viewing window based on the fields of view. For example, the viewing direction of the viewing window for the visual content of the video A may be determined based on the fields of view of the visual content of the videos A and B (e.g., based on spherical/non-spherical nature of the fields of view, based on the relative size of the fields of view, and/or based on the values that characterize the fields of view) and/or other information. The viewing direction of the viewing window of visual content may determine the direction of view/viewing angle of the punchout of the visual content. The viewing direction of the viewing window may be static or dynamic. For example, the viewing direction of the viewing window for the video A of may change as a function of progress through the progress length of the video A. Change in the viewing direction of the viewing window may result in movement of the viewing window (e.g., panning of the punchout). Thus, the movement (or non-movement) of the viewing window for the video A may be determined based on the fields of view of the visual content of the videos A and B and/or other information.

The size (viewing size, shape of the viewing window) of the viewing window for the visual content of the video A may be determined based on the fields of view of the visual content of the videos A and B (e.g., based on spherical/non-spherical nature of the fields of view, based on the relative size of the fields of view, and/or based on the values that characterize the fields of view) and/or other information. The size of the viewing window of visual content may determine the size of the punchout of the visual content. The size of the viewing window may be static or dynamic. For example, the size of the viewing window for the video A of may change as a function of progress through the progress length of the video A. Thus, the size(s) of the viewing window for the video A may be determined based on the fields of view of the visual content of the videos A and B and/or other information.

The rotation (viewing rotation, tilt of the viewing window) of the viewing window for the visual content of the video A may be determined based on the fields of view of the visual content of the videos A and B (e.g., based on spherical/non-spherical nature of the fields of view, based on the relative size of the fields of view, and/or based on the values that characterize the fields of view) and/or other information. The rotation of the viewing window of visual content may determine the rotation of the punchout of the visual content. The rotation of the viewing window may be static or dynamic. For example, the rotation of the viewing window for the video A of may change as a function of progress through the progress length of the video A. Thus, the rotation(s) of the viewing window for the video A may be determined based on the fields of view of the visual content of the videos A and B and/or other information.

A viewing window for visual content may be determined based on tracking of one or more subjects within the visual content. A subject within visual content may refer to depiction of one or more things (e.g., living objects, non-living objects, events) captured within the visual content. Tracking of a subject may include following the subject within the visual content, such as by determining the extent of the viewing window to include the subject. For example, one or more of viewing direction, viewing size, and/or viewing rotation of the viewing window for the visual content may be determined (e.g., set, changed) to keep the subject within the viewing window.

Tracking of subjects in visual content may include single subject tracking or multi-subject tracking. For single subject tracking, one subject may be identified and tracked within the viewing window for the visual content as a function of progress of the progress length of the video content. For multi-subject tracking, multiple subjects may be tracked within multiple viewing windows for the visual content as a function of progress of the progress length of the video content. The punchouts of the multiple viewing windows may be presented at the same time (e.g., split-screen, picture-in-picture) or may be presented sequentially (one after another).

In some implementations, one or more saliency ranking may be used to prioritize subjects that may be included within one or more viewing windows and/or may be offered as optioned to be included within one or more viewing windows. A saliency ranking may be based on one or more of subject identification/recognition, relative subject size, emotion identification (e.g., whether the subject is exhibiting particular emotion), presence persistency in time (duration of video content), audio cues, and/or other information about subjects captured within the video content. Based on saliency ranking, one or more of the subjects captured within different video content may be prioritized over other subjects for inclusion in a video edit. Different subjects with different saliency ranking may be provided with different types of edits (e.g., different size/rotation of field of view, different duration, different distortions) within a video edit.

A viewing window for visual content may be determined based on identification of one or more subjects within the visual content. For example, one or more of visual analysis (e.g., face detection, emotion detection, form/shape detection, block detection, scoring/priority) may be performed to identify when a depiction of interest occurs within the visual content of a video (identification of a moment of interest within the progress length of the video) and/or where the depiction of interest occurs within the visual content of the video (identification of viewing direction/viewing size/viewing rotation that includes the depiction of interest). The viewing window may be determined to include the depiction of interest within the punchout of the visual content. The visual analysis of the visual content may be used to determine whether the viewing direction of the viewing window should be static of dynamic, whether the size (e.g., zoom, shape) of the viewing window should be static (e.g., pointed in one direction) or dynamic (panning), and/or whether the rotation of the viewing window should be static or dynamic to frame the subject within the viewing window.

Framing of a subject within a viewing window may refer to one or more ways in which the subject is positioned within a punchout of the visual content. Framing of a subject within a viewing window may be maintained for a duration of the progress length. Maintaining framing of a subject within a viewing window may provide for stabilization of the visual content around and/or with the subject. Different framing of subjects may be added to a video edit for different depiction of interest within the visual content. Such addition of framing of subjects may add variety to detected moments of interest within the video content. For example, two different depictions of interest may be detected within the visual content. At two different corresponding moments of interest (points/duration during which the depiction of interest occurs within the visual content) within the video content, different framing of subjects may be used for the different depictions of interest so that the video edit appears more dynamic than if the same framing of subjects is used for the different depictions of interest.

Framing of a subject within a viewing window may be determined based on one or more of (1) progress length of the video content, (2) music/sound track for a video edit, (3) user preference(s), (4) style of video edit/framing (frame styles, such as different field of view, plane direction, zoom-ins/outs, panning between subjects, object tracking, whip cut that matches motion of one object to motion of another object/motion from one scene to another); (5) number and/or types of subjects, (6) saliency score, (7) type and/or identity of the depiction of interest, (8) duration of the moment of interest, and/or other information. Other information captured and/or determined from analysis of information captured within the visual content may be used to determining framing of a subject.

A visual window for one visual content may be used to determine a viewing window for another visual content. For example, two different videos (video A, video B)/video content may be combined into a video edit. A viewing window determined for the visual content of video A may be used to determine a viewing window for the visual content of video B. For example, the viewing window for the visual content of video A may have a particular viewing size and/or particular movement, and the viewing window for the visual content of video B may be determined to have the same viewing size and/or the same movement as the viewing window for the visual content of video A. Such determination of viewing windows may provide the same punchout of different visual content. For instance, the same punchouts may be generated to provide views in the same direction (e.g., panning to the right). As another example, the viewing window (e.g., viewing direction, viewing size, viewing rotation) for the visual content of A B may be determined to be different from the viewing window for the visual content of video A. Such determination of viewing windows may provide the different punchouts of different visual content. For instance, the different punchouts may be generated to provide views in the different directions (e.g., complimentary directions, such as panning to the right for video A vs panning to the left for video B; different types of directions, such as translational movement for video A vs rotational movement for video B).

Figure 7A:
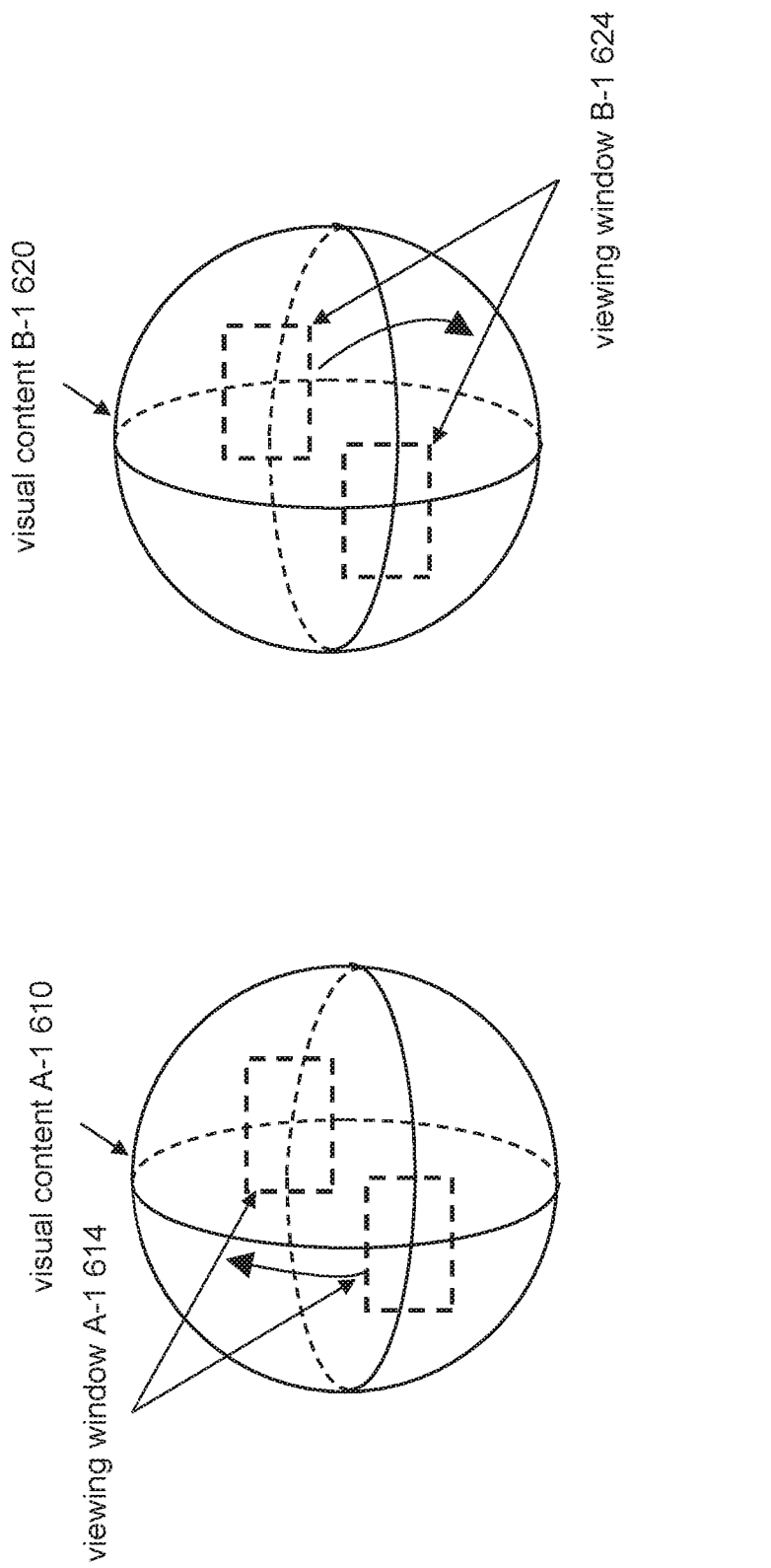
FIGS. 7A-7C illustrates examples of viewing windows for visual content.
Figure 7B:
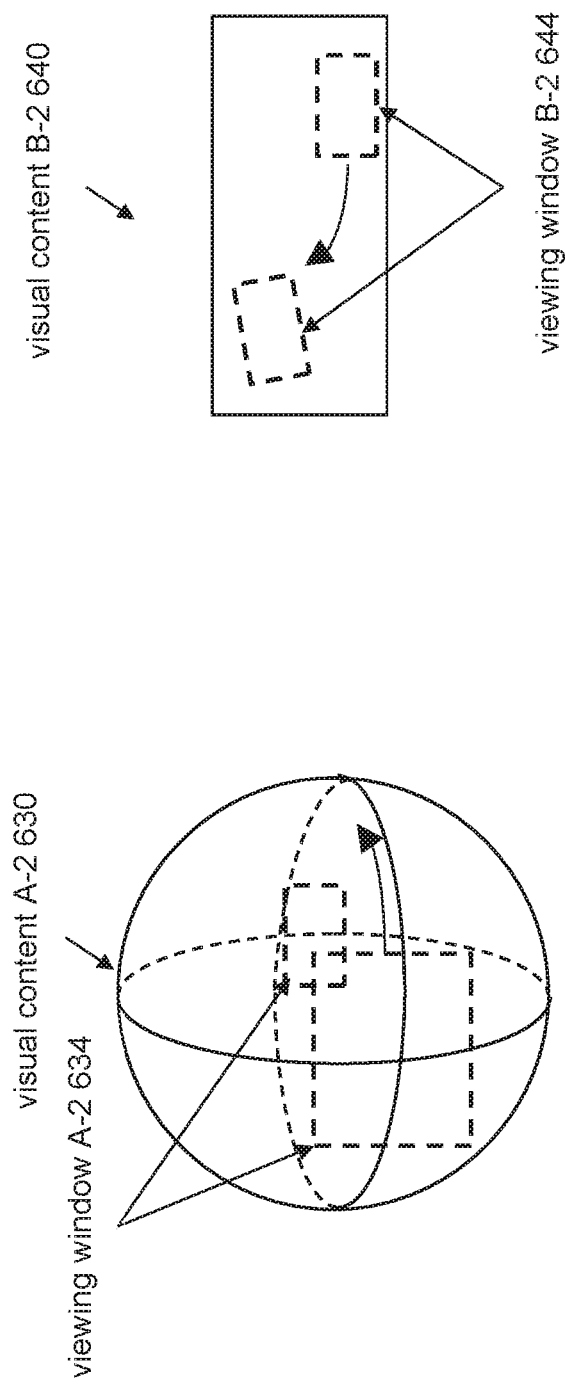
Figure 7C:
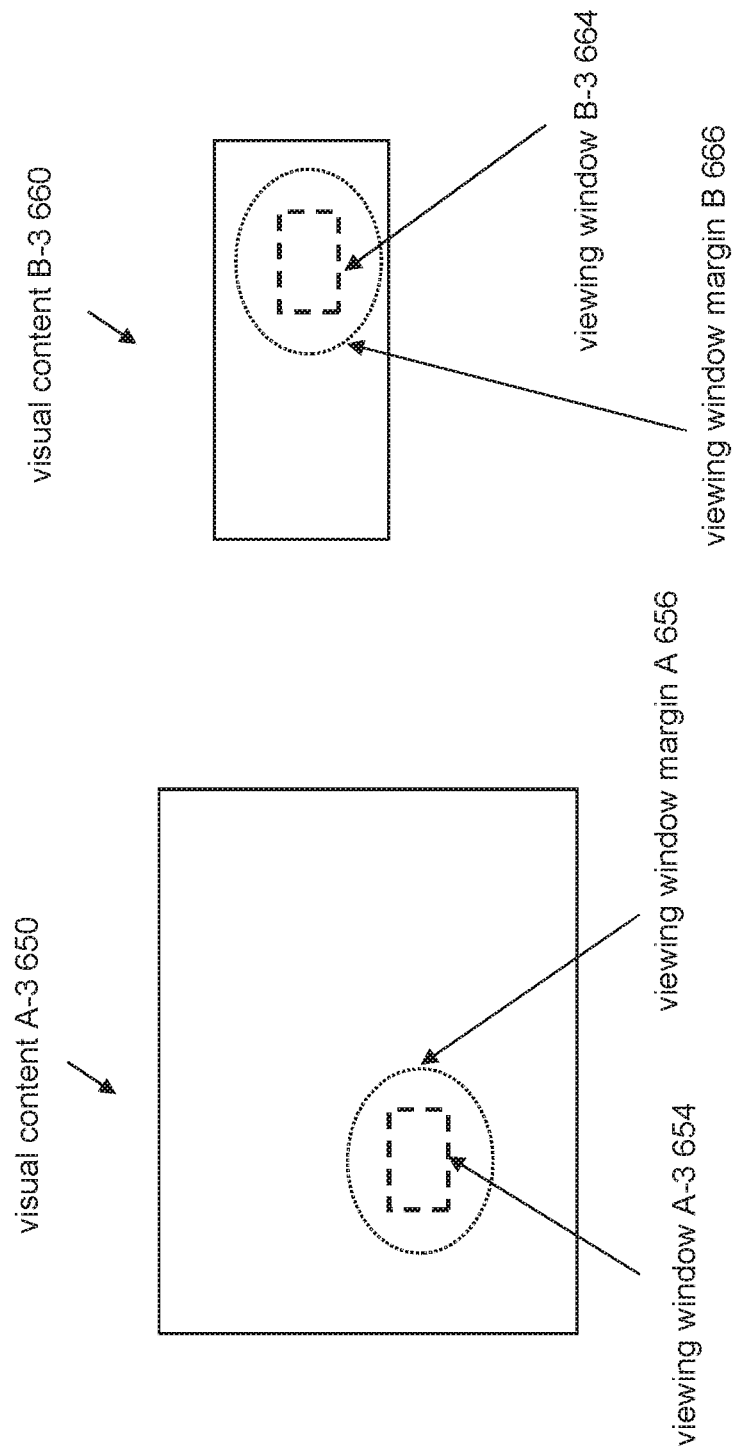

FIGS. 7A-7C illustrates examples of viewing windows determined for different visual content. While FIGS. 7A-7C illustrates one viewing window per visual content, this is merely as an example and is not meant to be limiting. The viewing window component 106 may be configured to determine two or more viewing windows per visual content. The viewing window component 106 may be configured to determine the same or different number of viewing windows for different visual content.

In FIG. 7A, based on the spherical field of view of the visual content A-1 610 and the spherical field of view of the visual content B-1 620, a viewing window A-1 614 may be determined for the visual content A-1 610 and a viewing window B-1 624 may be determined for the visual content B-1 620. In FIG. 7A, the viewing window A-1 614 and the viewing window B-1 624 may have the same viewing size and the same viewing rotation. Other viewing sizes and viewing rotations are contemplated.

The viewing window A-1 614 may move within the visual content A-1 610. For example, the viewing window A-1 614 may move during one or more portions of the corresponding progress length to keep a subject of interest within the viewing window A-1 614. The viewing window A-1 614 may move to keep a subject of interest within the viewing window A-1 614 using a particular framing style. The viewing window A-1 614 may move to prove a panning punchout of the visual content A-1 610. The viewing window A-1 614 may move from being directed at the front of the visual content A-1 610 to the back of the visual content A-1 610. The viewing window A-1 614 may move by changing the viewing direction vertically (up to the top of the visual content A-1 610, then down to the back of the visual content A-1 610).

The viewing window B-1 624 may move within the visual content B-1 620. For example, the viewing window B-1 624 may move during one or more portions of the corresponding progress length to keep a subject of interest within the viewing window B-1 624. The viewing window B-1 624 may move to keep a subject of interest within the viewing window B-1 624 using a particular framing style. The viewing window B-1 624 may move to prove a panning punchout of the visual content B-1 620. The viewing window B-1 624 may move from being directed at the back of the visual content B-1 620 to the front of the visual content B-1 620. The viewing window B-1 624 may move by changing the viewing direction vertically (down to the bottom of the visual content B-1 620, then up to the front of the visual content B-1 620).

The punchouts provided by the viewing window A-1 614 and the viewing window B-1 624 may be used to create a video edit including one or more portions of the visual content A-1 610 and the visual content B-1 620. For example, a video edit may initially include a punchout of the visual content A-1 610 based on the viewing window A-1 614, followed by a punchout of the visual content B-1 620 based on the viewing window B-1 624. The punchout of the visual content A-1 610 based on the viewing window A-1 614 may include extents of the visual content A-1 610 defined by the viewing window A-1 614 and the punchout of the visual content B-1 620 based on the viewing window B-1 624 may include extents of the visual content B-1 620 defined by the viewing window B-1 624. Such a video edit may appear to include a panning shot of spherical videos, with the presentation transitioning from one spherical video (the visual content A-1 610) to another spherical video (the visual content B-1 620) when the panning shot is directed at the back.

With both visual content including spherical fields of view, the viewing sizes, the viewing rotations, and/or the viewing directions of viewing windows may not be limited by the extents of the visual content. Spherical fields of view of both visual content may provide flexibility in determining the characteristics of the viewing windows.

In FIG. 7B, based on the spherical field of view of the visual content A-2 630 and the field of view 642 of the visual content B-2 640 (shown in FIG. 6B), a viewing window A-2 634 may be determined for the visual content A-2 630 and a viewing window B-2 644 may be determined for the visual content B-2 640. In FIG. 7B, the viewing window A-2 634 and the viewing window B-2 644 may have different viewing sizes and different viewing rotations. Other viewing sizes and viewing rotations are contemplated.

The viewing window A-2 634 may move within the visual content A-2 630. For example, the viewing window A-2 634 may move during one or more portions of the corresponding progress length to keep a subject of interest within the viewing window A-2 634. The viewing window A-2 634 may move to keep a subject of interest within the viewing window A-2 634 using a particular framing style. For instance, the viewing size of the viewing window A-2 634 may change based on the depiction of the subject of interest becoming smaller within the visual content A-2 630 and/or to zoom in on the subject of interest. The viewing window A-2 634 may move to prove a panning punchout of the visual content A-2 630. The viewing window A-2 634 may move from being directed at the front of the visual content A-2 630 to the back of the visual content A-2 630. The viewing window A-2 634 may move by changing the viewing direction laterally (moving left to the back of the visual content A-2 630).

The viewing window B-2 644 may move within the visual content B-2 640. For example, the viewing window B-2 644 may move during one or more portions of the corresponding progress length to keep a subject of interest within the viewing window B-2 644. The viewing window B-2 644 may move to keep a subject of interest within the viewing window B-2 644 using a particular framing style. The viewing size of the viewing window B-2 644 may be the same as the viewing size of the viewing window A-2 634 when the viewing window A-2 is directed to the back of the visual content A-2 630. The viewing size of the viewing window B-2 644 may not change based on the depiction of the subject of interest remaining consistent in size within the visual content B-2 640. Rather, the viewing rotation of the viewing window B-2 644 may change based on rotation of subject within the visual content B-2 640. The viewing window B-2 624 may move to prove a panning punchout of the visual content B-2 640. The viewing window B-2 644 may move from being directed at the lower-right of the visual content B-2 640 to the upper-left of the visual content B-2 640. The viewing window B-2 644 may move by changing the viewing direction laterally and vertically.

The punchouts provided by the viewing window A-2 634 and the viewing window B-2 644 may be used to create a video edit including one or more portions of the visual content A-2 630 and the visual content B-2 640. For example, a video edit may initially include a punchout of the visual content A-2 630 based on the viewing window A-2 634, followed by a punchout of the visual content B-2 640 based on the viewing window B-2 644. The punchout of the visual content A-2 630 based on the viewing window A-2 634 may include extents of the visual content A-2 630 defined by the viewing window A-2 634 and the punchout of the visual content B-2 640 based on the viewing window B-2 644 may include extents of the visual content B-2 640 defined by the viewing window B-2 644. Such a video edit may appear to include a panning shot of two videos, with the presentation including a wide view of the visual content that focuses on a smaller view as the view is panned laterally from front to the back (from the visual content A-2 630), followed by the view swinging to the left and right, with slight rotation of the view to the left (from the visual content B-2 640).

With the visual content A-2 630 including a spherical field of view and the visual content B-2 640 including a non-spherical field of view, the viewing sizes, the viewing rotations, and/or the viewing directions of viewing windows may be limited by the extents of the visual content B-2 640. The non-spherical field of view of the visual content B-2 640 may provide a limit in determining the characteristics of the viewing windows. That is, the characteristics of the viewing window for the visual content A-2 630 may be bounded by the non-spherical field of view of the visual content B-2 640 such that transition between the visual content A-2 630 and the visual content B-2 640 within a video edit is seamless. That is, the punchout of the visual content A-2 630 (having a spherical field of view) may be determined, limited, and/or adjusted based on the field of view 642 (shown in FIG. 6B) of the visual content B-2 640 to include the same viewing size and/or viewing rotation as the punchout of the visual content B-2 640. The punchout of the visual content A-2 630 may be determined, limited, and/or adjusted based on the field of view 642 of the visual content B-2 640 so that the size and/or framing of subject(s) within the viewing window A-2 634 may appear to be the same or comparable to the size and/or framing of subject(s) within the viewing window B-2 644.

In FIG. 7C, based on the field of view 652 of the visual content A-3 650 and the field of view 662 of the visual content B-3 660 (shown in FIG. 6C), a viewing window A-3 654 may be determined for the visual content A-3 650 and a viewing window B-3 664 may be determined for the visual content B-3 660. In FIG. 7C, the viewing window A-3 654 and the viewing window B-3 664 may have the same viewing size and the same viewing rotation. Other viewing sizes and viewing rotations are contemplated.

The viewing window A-3 654 may move within the visual content A-3 650. For example, the viewing window A-3 654 may move during one or more portions of the corresponding progress length to keep a subject of interest within the viewing window A-3 654. The viewing window A-3 654 may move to keep a subject of interest within the viewing window A-3 654 using a particular framing style. For instance, the viewing window A-3 654 may move within an area indicated by a viewing window margin A 656 to stabilize the shot of the subject of interest within the punchout. Other characteristics of the viewing window A-3 654 may change to stabilize the shot of the subject of interest. For example, the viewing size and/or the viewing rotation of the viewing window A-3 654 may change to provide electronic stabilization of the subject within the punchout. The change in viewing direction, the viewing size, and/or the viewing rotation may be bounded by the viewing window margin A 656.

The viewing window B-3 664 may move within the visual content B-3 660. For example, the viewing window B-3 664 may move during one or more portions of the corresponding progress length to keep a subject of interest within the viewing window B-3 664. The viewing window B-3 664 may move to keep a subject of interest within the viewing window B-3 664 using a particular framing style. For instance, the viewing window B-3 664 may move within an area indicated by a viewing window margin B 666 to stabilize the shot of the subject of interest within the punchout. Other characteristics of the viewing window B-3 664 may change to stabilize the shot of the subject of interest. For example, the viewing size and/or the viewing rotation of the viewing window B-3 664 may change to provide electronic stabilization of the subject within the punchout. The change in viewing direction, the viewing size, and/or the viewing rotation may be bounded by the viewing window margin B 666.

The punchouts provided by the viewing window A-3 654 and the viewing window B-3 664 may be used to create a video edit including one or more portions of the visual content A-3 650 and the visual content B-3 660. For example, a video edit may initially include a punchout of the visual content B-3 660 based on the viewing window B-3 664, followed by a punchout of the visual content A-3 650 based on the viewing window A-3 654. The punchout of the visual content A-3 650 based on the viewing window A-3 654 may include extents of the visual content A-3 650 defined by the viewing window A-3 654 and the punchout of the visual content B-3 660 based on the viewing window B-3 664 may include extents of the visual content B-3 660 defined by the viewing window B-3 664. Such a video edit may appear to include a stabilized shot of two videos, with the presentation including a view of the visual content is stabilized on one or more subjects within the visual content.

With the visual content A-3 650 including a non-spherical field of view and the visual content B-3 660 including a smaller non-spherical field of view, the viewing sizes, the viewing rotations, and/or the viewing directions of viewing windows may be limited by the extents of the visual content B-3 660. The smaller non-spherical field of view of the visual content B-3 660 may provide a limit in determining the characteristics of the viewing windows. That is, the characteristics of the viewing window for the visual content A-3 650 may be bounded by the smaller non-spherical field of view of the visual content B-3 660 such that transition between the visual content A-3 650 and the visual content B-3 660 within a video edit is seamless. That is, the punchout of the visual content A-3 650 (having the larger field of view 652, shown in FIG. 6C) may be determined, limited, and/or adjusted based on the smaller field of view 662 (shown in FIG. 6C) of the visual content B-3 660 to include the same size of margin as the punchout of the visual content B-3 660. The viewing window margin A 656 for the visual content A-3 650 may be the same or similar to the viewing window margin B 666. The extent of area covered by the viewing window margin A 656 for the visual content A-3 650 may be limited by the field of view 662 of the visual content B-3 660. The punchout of the visual content A-3 650 may be determined, limited, and/or adjusted based on the field of view 652 of the visual content B-3 660 so that the size, framing, and/or stabilization of subject(s) within the viewing window A-3 654 may appear to be the same or comparable to the size, framing, and/or stabilization of subject(s) within the viewing window B-3 664.

The video edit component 108 may be configured to generate one or more video edits of multiple videos. A video edit may refer to a particular arrangement and/or manipulation of one or more portions (e.g., video clips) of the video content. A video edit may define which portions of the video content (e.g., visual content, audio content) are included for playback and the order in which the portions are to the presented on playback. For example, a video edit may comprise portions of a number of video clips. The video edit component 108 may select one or more clip characteristics (e.g., time amount of video clips, viewing direction, viewing size, viewing rotation, viewing window, field of view, distortion) of the video clips for inclusion within the video edit based on information about the video clips to form a single and/or a multi-clip video edit. A video edit may provide a summary and/or an overview of the video(s) from which the video edit is generated. A video edit may define one or more effects (e.g., transition effects) to be used during playback. For example, a video edit of multiple videos may define one or more transition effects to be used between presentation of the visual content of one video and the visual content of another video during playback.

For example, the video edit component 108 may generate a video edit of the video A, the video B, and/or other videos. The video edit of the video A and the video B may be generated based on the viewing window for the visual content of the video A, the viewing window for the visual content of the video B, and/or other information. The video edit may include a punchout of the visual content of the video A based on the corresponding viewing window and a punchout of the visual content of the video B based on the corresponding viewing window. A punchout of the visual content based on a corresponding viewing window may include extent(s) of the visual content defined by the corresponding viewing window. Other information may be used to generate the video edit.

Different types of punchouts may be used to generate video edits based on the types of videos. For example, the types of punchouts used for a video edit of a single spherical video may differ from the types of punchouts used for a video edit of multiple spherical videos, which may also differ from the types of punchouts used for a video edit of one or more spherical videos with one or more non-spherical videos. For example, if a footage of a spherical video is to be combined with a footage of a non-spherical video, the punchout for the footage of the spherical video may be adjusted based on the field of view and/or the distortion of the non-spherical video to provide a more seamless transition between the spherical video and the non-spherical video. For instance, the punchout of the spherical video may be adjusted to include the size of the viewing window and distortion as the non-spherical video, and/or the punchout of the spherical video may be adjusted so that the size of the subjects within the punchout of the spherical video appears to be comparable to the size of the subjects within the punchout of the non-spherical video.

In some implementations, the video edit component 108 may be determine one or more distortions to be applied to visual content within one or more of the viewing windows. Distortion within visual content may form a part of artistic expression of the video content and/or a video edit including the video content. Distortion within visual content may exist due to the type of optical element (e.g., lens) used to capture the visual content. Distortion may be applied to visual content to simulate the use of particular optical element in the capture of the visual content. For example, distortion(s) may be applied to one or more videos to match the distortion present within multiple videos and/or to create different distortions within different videos.

Similarity and/or difference of distortion within multiple video content of a video edit may impact the experience of consuming the video edit. For example, a quick/cut transition within a video edit from one video to another video with different distortions may lead to a jarring experience when viewing the video edit. A smoother video edit may be creating by digitally altering the distorting within one or both of the video clips to control the change in distortion (or no change in distortion) at transition points in the video edit. The change in distortion may last through the duration of the video edit or for a portion of the video edit. For example, a video edit may include a punchout of a non-spherical video, followed by a punchout of a spherical video. The distortion within the punchout of the spherical video may be digitally altered to match the distortion within the punchout of the non-spherical video at the transition from the non-spherical video to the spherical video. The distortion with the spherical may be restored and/or otherwise changed (e.g., gradually changed from matching the distortion of the non-spherical video to the original distortion and/or other distortion) after the transition point. Other types of distortions/change in distortion of video content are contemplated.

Different types of punchouts may be used to generate video edits based on whether the video edit includes a single video edit or multiple video edit. That is, depending on whether the video edit contains portions from a single video or multiple videos, different types of punchouts may be used. For example, based on the video edit being generated from a single video including one or more depictions of interest, the punchout may follow one or more subjects of interest, may use a single style of framing, or change styles of framing used for the video edit. Based on the video edit being generated from multiple videos, different viewing windows (e.g., viewing direction, viewing size, viewing rotation) may be used for different videos.

A punchout of a spherical video may be used to create traditional two-dimensional video edit from the spherical video. One or more punchouts and editing's of the spherical video may be presented as options for user selection. For example, rather than require the user manually identify punchouts for inclusion in a video edit of a spherical video, different cuts of the spherical video using different punchouts may be provided as suggested edits for user selection.

Stitching of visual content (of spherical visual content) may be performed based on need and/or other information. Stitching of visual content (e.g., images, video frames) to generate spherical visual content (e.g., spherical images, spherical video frames) may be process intensive and performing stitching before editing the spherical video may require consumption of large amount of resources. Instead, the desired punchouts of the spherical video may be used to identify those portions of the visual content images that are required to be stitched for video edit generation. For instance, when a viewing window includes visual content captured by two different image sensors, stitching may be performed for the visual content included within the viewing window. When a viewing window includes visual content captured by a single image sensor, stitching of visual content need not be performed to include the visual content in the video edit. Limiting stitching of visual content to those instances in which portions of visual content captured by different image sensors are within a viewing window may provide for resource savings (e.g., computing power, time, memory, power consumption) compared to stitching multiple visual content for the entire progress length of the video edit. Stitching of visual content may be performed at lower resolution than the resolution of the visual content to generate the video edit and/or to generate a preview of the video edit.

Punchouts of multiple visual content may be included within a video edit for simultaneous presentation and/or sequential presentation. For example, multiple punchouts for different visual content may provide tracking of multiple subjects. The video edit may include punchouts of multiple subjects presented at the same time (e.g., split screen, picture-in-picture) and/or punchouts of multiple subjects presented at different times.

A punchout of visual content may be accompanied by a punchout of corresponding audio content. For example, a video edit including a punchout of the visual content of a video may include a punchout of the audio content of the video. A punchout of the audio content may include one or more portions (e.g., temporal portions, spatial portions) of the audio content. For example, the portion(s) of the audio content included in the video edit may be selected based on spatiality or directionality of the audio content (e.g., selecting portion of the audio content originating from an audio source within the viewing window) and/or other information. For example, referring to FIG. 7A, a video edit including a punchout of the visual content A-1 610 based on the viewing window A-1 614 may include one or more portions of the audio content captured with the visual content A-1 610, where the portion(s) of the audio content originated from one or more audio sources within the viewing window A-1 614 and/or was recorded by one or more audio sensors associated with (e.g., located within, assigned to, directed to) the viewing window A-1 614.

A video edit may be generated as encoded video content and/or instructions for rendering the video edit. For example, the video edit may be generated as an encoded version of a particular video clip, and the video clip may be opened in a video player for presentation. The video edit may be generated as instructions for presenting video content, such as instructions identifying arrangements and/or manipulations of one or more portions of video content included in the video edit. For example, the video edit may be generated as information defining a director track that includes information as to which portions (portions of progress length, portions of visual content) of the video content are included in the video edit, the order in which the portions are to the presented on playback, and the edits to be applied to the different portions. A video player may use the director track to retrieve the portions of the video content identified in the video edit for presentation, arrangement, and/or editing when the video edit is opened/to be presented.

Video edit information defining the video edit (e.g., encoded video content, director track) may be stored in one or more storage media. For example, the video edit information may be stored in the electronic storage 13, remote storage locations (storage media located at/accessible through a server), and/or other locations. In some implementations, the video edit information may be stored through one or more intermediary devices. For example, the processor 11 may be located within a computing device without a connection to the storage device (e.g., the computing device lacks WiFi/cellular connection to the storage device). The video edit information may be stored through another device that has the necessary connection (e.g., the computing device using a WiFi/cellular connection of a paired mobile device, such as a smartphone, tablet, laptop, to store information in one or more storage media). Other storage locations for and storage of the video edit information are contemplated.

In some implementations, different videos may be captured by different image capture devices. An image capture device may refer to a device captures visual content. An image capture device may capture visual content in form of images, videos, and/or other forms. For example, an image capture device may refer to a camera, an image sensor, and/or other image capture devices.

For example, the video A may be captured by one image capture device, and the video B may be captured by another image capture device. One or both of the image capture devices may generate metadata during capture of the corresponding videos. The metadata may be used to temporally (location within progress length) and spatially (location within field of view) identify one or more depictions of interest within the visual content. For example, metadata generated by the image capture device that captured by the video A may be used to temporarily and spatially identify a depiction of interest within the visual content of the video A and the visual content of the video B. The depiction of interest within the visual content of the video A and the depiction of interest within the visual content of the video B may include depictions of a same subject or visual depictions of different subjects. For example, the visual content of videos A and B may provide depiction of the same object of interest and/or the same event of interest captured from different perspectives. The visual content of videos A and B may provide depiction of different objects of interest and/or different events of interest.

Figure 8:
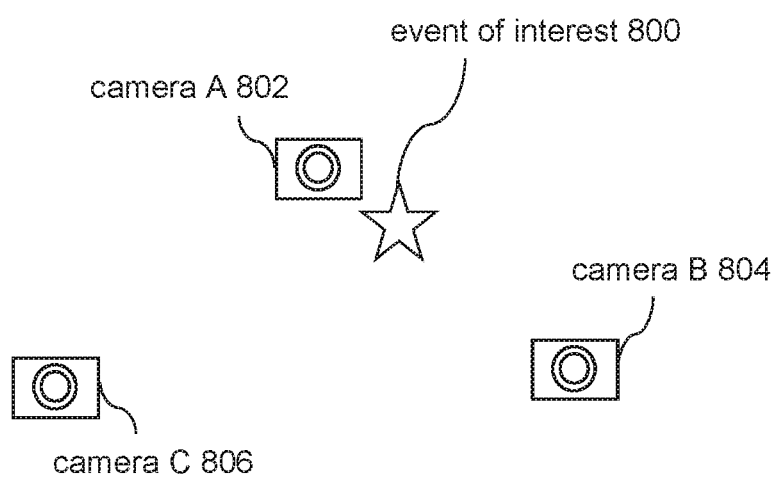
FIG. 8 illustrates an example of multiple cameras capturing an event of interest.

FIG. 8 illustrates an example of multiple cameras capturing an event of interest. As shown in FIG. 8, a camera A 802, a camera B 804, and a camera C 806 may capture within video content including depiction of an event of interest 800. One or more of the cameras 802, 804, 806 may include a spherical camera/capture spherical visual content. One or more of the cameras 802, 804, 806 may include a non-spherical camera/capture non-spherical visual content. The event of interest 800 may be captured by the cameras 802, 804, 806 from different angles and/or different distances. Separately analyzing the video content and/or metadata captured by the different cameras 802, 804, 806 to identify the depiction of the event of interest 800 may require consumption of large amount of resources. Such analysis of the video content and/or metadata may not benefit from analysis of other video content and/or metadata.

Rather than separately analyzing the video content and/or metadata captured by the different image capture devices, analysis of video content, metadata, and/or other information captured by a single image capture device may be used to identify the depiction of interest within video content captured by multiple image capture devices. For example, the video content and/or the metadata generated by the camera A 802 may be analyzed to identify the depiction of the event of interest 800 within the video content captured by the camera A 802, and to also identify or facilitate the identification of the depiction of the event of interest 800 within the video content captured by the camera B 804 and the camera C 806. That is, the analysis of the video content and/or the metadata captured by the camera A 802 may be used to temporally and spatially identify the depiction of interest within the video content captured by the camera B 804 and the camera C 806. Metadata may include information generate from sensors other than image sensors. For example, metadata may include information generated from one or more sound sensors, one or more motion sensors (e.g., accelerometer, gyroscope, inertial measurement unit), one or more position sensors (e.g., GPS, altimeter), and/or other non-image sensors.

For example, referring to FIG. 8, the visual content (e.g., images, video frames) captured by the multiple cameras 802, 804, 806 may be organized based on metadata of the camera A 802 (source camera). For example, the metadata of the source camera may be used to identify depiction of interest (primary content) within the video content captured by the source camera. The metadata of the source camera may also be used to identify other content (supplemental content) captured by other camera(s) (e.g., the camera B 804, the camera C 806). For example, if the other camera(s) include a spherical camera, the (1) moments in the video content captured by the other spherical camera(s) and (2) the fields of view at the corresponding moments may be identified based on the metadata of the source camera. The metadata of the source camera may be used to estimate when and where within the video content captured by different cameras include capture of the same event of interest from different perspectives (e.g., based on positional aspects of the source camera and the other cameras).

Visual analysis may be performed to confirm when and where within the visual content captured by the different cameras include depiction of interest. For example, based on the metadata generated by the camera A 802, when and where a depiction of interest occurs within the visual content captured by the camera B 804 may be estimated. Visual analysis of the visual content captured by the camera B 804 may be localized to the estimated temporal and spatial portion(s) of the visual content. For example, based on the analysis of the metadata generated by the camera A 802 indicating that a depiction of interest is likely captured within a field of view at a moment within the visual content captured by the camera B 804, visual analysis may be performed within the field of view at the moment within the visual content captured by the camera B 804 to identify/confirm the depiction of interest. In other words, the metadata generated by the camera A 802 may be used to identify which portions of the visual content captured by the camera B 804 may be analyzed for depiction of interest identification/confirmation. Such localization of the visual analysis within the visual content may provide for resource savings (e.g., computing power, time, memory, power consumption) compared to performing visual analysis over the entirety of the visual content (e.g., entire spherical visual content).

Visual analysis of the visual content captured by the other camera(s) may take advantage of the visual content of the visual content captured by the source camera. For example, analysis of the visual content captured by the camera A 802 may identify one or more physical characteristics of the event of interest 800, such as the shape(s) and/or color(s) of subject(s) involved in the event of interest 800. The analysis of the visual content captured by the camera B 804 and the camera C 806 may be simplified based on the identified physical characteristics. For instance, rather than performing comprehensive visual analysis, the visual analysis of the visual content captured by the camera B 804 and the camera C 806 may be limited to determining whether one or more of the physical characteristics of the event of interest 800 identified from the analysis of the visual content captured by the camera A 802 are found within the visual content captured by the camera B 804 and the camera C 806.

The metadata of the source camera may be richer, more detailed, and/or more granular than the metadata generated by other cameras. For example, the metadata of the source camera may include types of sensor information not included in the metadata of the other camera(s) (e.g., the source camera includes a sensor not included in the other camera(s)), the metadata of the source camera may include more sensitive sensor information than the metadata of the other camera(s) (e.g., the source camera includes a more sensitive sensor than the other camera(s)), and/or the metadata of the source camera may include greater amount of sensor information than the metadata of the other camera(s) (e.g., the sensor of the source camera operates/gather information at a higher speed than the sensor of the other camera(s)).

While the present disclosure may be directed to video content, one or more other implementations of the system may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
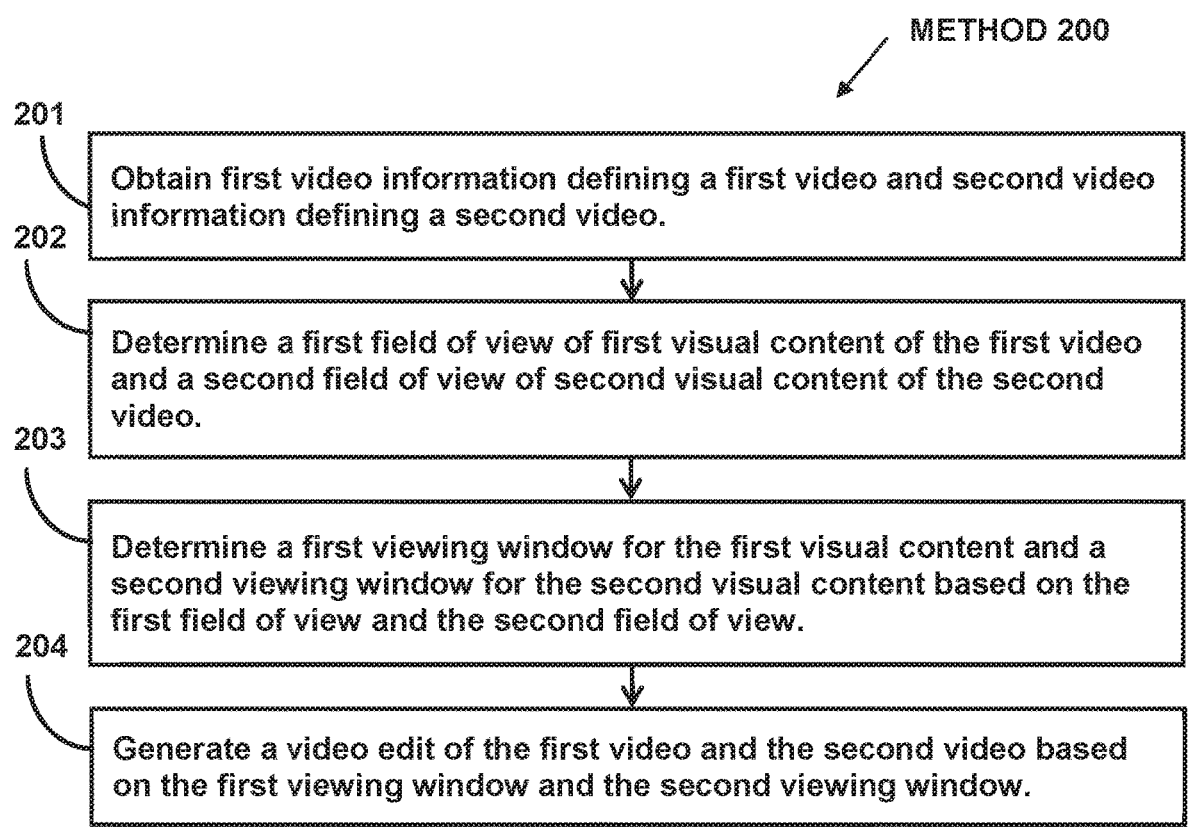
FIG. 2 illustrates a method for providing punchouts of videos.

FIG. 2 illustrates method 200 for providing punchouts of videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, first video information defining a first video and second video information defining a second video may be obtained. The first video may include first video content having a first progress length, and the second video may include second video content having a second progress length. The first video content may include a first set of video frames that defines first visual content as a function of progress through the first progress length, and the second video content may include a second set of video frames that defines second visual content as a function of progress through the second progress length. The first visual content may have a first field of view, and the second visual content may have a second field of view. In some implementation, operation 201 may be performed by a processor component the same as or similar to the video information component 102 (Shown in FIG. 1 and described herein).

At operation 202, the first field of view of the first visual content and the second field of view of the second visual content may be determined. In some implementations, operation 202 may be performed by a processor component the same as or similar to the field of view component 104 (Shown in FIG. 1 and described herein).

At operation 203, a first viewing window for the first visual content and a second viewing window for the second visual content may be determined based on the first field of view and the second field of view. The first viewing window may define one or more extents of the first visual content, and the second viewing window may define one or more extents of the second visual content. In some implementations, operation 203 may be performed by a processor component the same as or similar to the viewing window component 106 (Shown in FIG. 1 and described herein).

At operation 204, a video edit of the first video and the second video based may be generated based on the first viewing window and the second viewing window. The video edit may include a first punchout of the first visual content based on the first viewing window and a second punchout of the second visual content based on the second viewing window. In some implementations, operation 204 may be performed by a processor component the same as or similar to the video edit component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that provides punchouts of videos, the system comprising:
one or more physical processors configured by machine-readable instructions to:
obtain first video information defining a first video, the first video including first video content having a first progress length, the first video content including a first set of video frames that defines first visual content as a function of progress through the first progress length, the first visual content having a first field of view;
obtain second video information defining a second video, the second video including second video content having a second progress length, the second video content including a second set of video frames that defines second visual content as a function of progress through the second progress length, the second visual content having a second field of view;
determine the first field of view of the first visual content and the second field of view of the second visual content;
determine a first viewing window for the first visual content based on the first field of view and the second field of view, the first viewing window defining one or more extents of the first visual content;
determine a second viewing window for the second visual content based on the first field of view and the second field of view, the second viewing window defining one or more extents of the second visual content; and
generate a video edit of the first video and the second video based on the first viewing window and the second viewing window, the video edit including a first punchout of the first visual content based on the first viewing window and a second punchout of the second visual content based on the second viewing window.

2. The system of claim 1, wherein the first punchout includes the one or more extents of the first visual content defined by the first viewing window and the second punchout includes the one or more extents of the second visual defined by the second viewing window.

3. The system of claim 1, wherein the first field of view includes a spherical field of view.

4. The system of claim 3, wherein:
the one or more extents of the first visual content defined by the first viewing window includes:
a first set of extents based on the first field of view and the second field of view including the spherical field of view; or a second set of extents based on the first field of view including the spherical field of view and the second field of view including a non-spherical field of view;
wherein the first set of extents is different from the second set of extents.

5. The system of claim 1, wherein the one or more physical processors are, to determine the first viewing window for the first visual content based on the first field of view and the second field of view, further configured by the machine-readable instructions to determine a size of the first viewing window based on the first field of view and the second field of view.

6. The system of claim 1, wherein the one or more physical processors are, to determine the first viewing window for the first visual content based on the first field of view and the second field of view, further configured by the machine-readable instructions to determine a movement of the first viewing window based on the first field of view and the second field of view.

7. The system of claim 1, wherein the first viewing window for the first visual content is determined further based on tracking of a subject within the first visual content.

8. The system of claim 1, wherein:
the first video is captured by a first image capture device;
the second video is captured by a second image capture device;
the first image capture device generates metadata during capture of the first video; and
the metadata is used to temporally and spatially identify first depiction of interest within the first visual content and second depiction of interest within the second visual content.

9. The system of claim 8, wherein the first depiction of interest and the second depiction of interest include visual depictions of a same subject.

10. The system of claim 8, wherein the first depiction of interest and the second depiction of interest include visual depictions of different subjects.

11. A method for providing punchouts of videos, the method performing by a computing system including one or more processors, the method comprising:
obtaining, by the computing system, first video information defining a first video, the first video including first video content having a first progress length, the first video content including a first set of video frames that defines first visual content as a function of progress through the first progress length, the first visual content having a first field of view;
obtaining, by the computing system, second video information defining a second video, the second video including second video content having a second progress length, the second video content including a second set of video frames that defines second visual content as a function of progress through the second progress length, the second visual content having a second field of view;
determining, by the computing system, the first field of view of the first visual content and the second field of view of the second visual content;
determining, by the computing system, a first viewing window for the first visual content based on the first field of view and the second field of view, the first viewing window defining one or more extents of the first visual content;
determining, by the computing system, a second viewing window for the second visual content based on the first field of view and the second field of view, the second viewing window defining one or more extents of the second visual content; and
generating, by the computing system, a video edit of the first video and the second video based on the first viewing window and the second viewing window, the video edit including a first punchout of the first visual content based on the first viewing window and a second punchout of the second visual content based on the second viewing window.

12. The method of claim 11, wherein the first punchout includes the one or more extents of the first visual content defined by the first viewing window and the second punchout includes the one or more extents of the second visual defined by the second viewing window.

13. The method of claim 11, wherein the first field of view includes a spherical field of view.

14. The method of claim 13, wherein:
the one or more extents of the first visual content defined by the first viewing window includes:
a first set of extents based on the first field of view and the second field of view including the spherical field of view; or
a second set of extents based on the first field of view including the spherical field of view and the second field of view including a non-spherical field of view;
wherein the first set of extents is different from the second set of extents.

15. The method of claim 11, wherein determining the first viewing window for the first visual content based on the first field of view and the second field of view includes determining a size of the first viewing window based on the first field of view and the second field of view.

16. The method of claim 11, wherein determining the first viewing window for the first visual content based on the first field of view and the second field of view includes determining a movement of the first viewing window based on the first field of view and the second field of view.

17. The method of claim 11, wherein the first viewing window for the first visual content is determined further based on tracking of a subject within the first visual content.

18. The method of claim 11, wherein:
the first video is captured by a first image capture device;
the second video is captured by a second image capture device;
the first image capture device generates metadata during capture of the first video; and
the metadata is used to temporally and spatially identify first depiction of interest within the first visual content and second depiction of interest within the second visual content.

19. The method of claim 18, wherein the first depiction of interest and the second depiction of interest include visual depictions of a same subject.

20. The method of claim 18, wherein the first depiction of interest and the second depiction of interest include visual depictions of different subjects.

* * * * *